United States Patent [19]

Mowrer et al.

[11] Patent Number: 5,618,860

[45] Date of Patent: Apr. 8, 1997

[54] EPOXY POLYSILOXANE COATING AND FLOORING COMPOSITIONS

[75] Inventors: Norman R. Mowrer, La Habra; Raymond E. Foscante, Yorba Linda; J. Luis Rojas, Anaheim Hills, all of Calif.

[73] Assignee: Ameron International Corporation, Pasadena, Calif.

[21] Appl. No.: 342,414

[22] Filed: Nov. 18, 1994

Related U.S. Application Data

[63] Continuation-in-part of Ser. No. 64,398, May 19, 1993, abandoned.

[51] Int. Cl.$^6$ ..................................... C08K 3/20
[52] U.S. Cl. .................. 523/421; 528/27; 528/18; 528/15; 528/14; 528/38; 525/476; 523/414; 523/417; 106/287.11; 106/806; 106/816; 106/712; 427/386; 427/387
[58] Field of Search ..................... 528/27, 18, 15, 528/14, 38; 525/476; 523/414, 421, 417; 106/287.11, 806, 816, 712; 427/386, 387

[56] References Cited

U.S. PATENT DOCUMENTS

| | | | |
|---|---|---|---|
| 3,183,198 | 5/1965 | Wagner | 260/18 |
| 3,297,724 | 1/1967 | McConnell et al. | 260/348 |
| 3,395,128 | 7/1968 | Hale et al. | 260/77.5 |
| 4,250,074 | 2/1981 | Foscante et al. | 260/32.8 EP |
| 4,385,158 | 5/1983 | Mikami et al. | 525/476 |
| 4,546,018 | 10/1985 | Ryuzo et al. | 427/407.2 |
| 4,678,835 | 7/1987 | Chang et al. | 525/100 |
| 4,851,481 | 7/1989 | Kuriyama et al. | 525/454 |
| 5,019,607 | 5/1991 | Coltrain et al. | 523/435 |

*Primary Examiner*—Margaret W. Glass
*Attorney, Agent, or Firm*—Christie, Parker & Hale, LLP

[57] ABSTRACT

A sprayable, trowelable epoxy polysiloxane based coating and flooring composition exhibiting excellent weatherability in sunlight and superior chemical, corrosion and impact resistance after curing is made up of: (a) a resin component which includes a non-aromatic epoxy resin having at least two 1,2-epoxy groups per molecule; a polysiloxane and an organooxysilane; (b) an difunctional aminosilane hardener component; (c) an organotin catalyst; and (d) an aggregate or pigment component. Organic solvents and flow modifying agents may be added to facilitate spray application. The resin component, hardener component, aggregate component and desired catalysts are combined in the presence of a sufficient amount of water to promote the hydrolysis of polysiloxane and/or organooxysilane and the polycondensation of the silanols produced by such hydrolysis. The aminosilane and epoxide resin react to form a cured linear epoxy polymer. The polysiloxane and/or organooxysilane undergo a hydrolysis reaction which produces silanol. The silanol undergoes polycondensation forming a linear epoxy-modified polysiloxane polymer.

20 Claims, No Drawings

EPOXY POLYSILOXANE COATING AND FLOORING COMPOSITIONS

RELATION TO COPENDING APPLICATION

This application is a continuation in part to U. S. patent application Ser. No. 08/064,398, filed on May 19, 1993, now abandoned.

FILED OF THE INVENTION

This invention relates to epoxy resin based coating and flooring materials having improved properties of flexibility, weatherability, compressive strength and chemical resistance.

BACKGROUND

Epoxy coatings and flooring materials are well know and have gained commercial acceptance as protective and decorative coatings for steel, aluminum, galvanizing, wood and concrete in maintenance, marine, construction, architectural, aircraft and product finishing markets. The basic raw materials used to prepare these coatings generally comprise as essential components (a) an epoxy resin, (b) a hardener and (c) a pigment or aggregate component.

The epoxide resins are those having more than one 1,2-epoxy group per mole and may be saturated or unsaturated, aliphatic, cycloaliphatic, or heterocyclic. The epoxide resins generally contain glycidyl ester or glycidyl ether groups and have a weight per epoxide of from 100 to 2000. The hardener is usually chosen from the general classes of aliphatic amines or aliphatic amine adducts, polyamides, polyamidoamines, cycloaliphatic amines, aromatic amines, Mannich bases, ketimines and carboxylic derivatives. Pigments or aggregates include titanium dioxide and other inorganic and organic color pigments, silica, barium sulfate, magnesium silicate, calcium silicate, fumed silica, garnet, feldspar, carbon black and the like.

Known epoxy based flooring and coating materials often contain several components in addition to the epoxy resin, hardener and pigment/aggregate. These include such additives as nonreactive and reactive diluents including mono- and di-epoxides, plasticizer, bituminous and asphaltic extenders, adhesion promoters, suspending agents and thixotropes, surfactants, corrosion inhibitors, ultraviolet light stabilizers, catalysts and rheological modifiers.

Both the resin and hardener components may also contain volatile organic solvents whose primary function is to lower viscosity thereby providing a consistency suitable for spray application with conventional air, airless and electrostatic spray equipment.

Epoxy based protective coatings represent one of the most widely used methods of corrosion control. They are used to provide long term protection of steel, concrete, aluminum and other structures under a broad range of corrosive conditions, extending from atmospheric exposure to full immersion in strongly corrosive solutions. For over 20 years, these coatings have been formulated from either a solid or liquid epoxy resin cured with an aliphatic polyamine or polyamide resin e.g., Shell Epon 1001 or Epon 828 epoxy resins cured with diethylene triamine (DETA) or Versamid 100 series polyamides. In typical two package coating systems, the epoxy resin component is usually the vehicle for pigment grinding and dispersion of other aggregates and various additives.

Epoxy based protective coatings possess many properties which make them desirable as coating materials. They are readily available and are easily applied by a variety of methods including spraying, rolling and brushing. They adhere well to steel, concrete and other substrates, have low moisture vapor transmission rates and act as barriers to water, chloride and sulfate ion ingress, provide excellent corrosion protection under a variety of atmospheric exposure conditions and have good resistance to many chemicals and solvents.

Epoxy based materials are also formulated as surfacers or flooring materials primarily for application over concrete. One commercially successful epoxy based flooring material utilizes liquid bisphenol A epoxy resin and a modified aliphatic polyamine combined with graded silica sand aggregate as a third component. It can be spray applied and has excellent compressive, tensile and flexural strength, good resistance to impact and abrasion and resists a wide variety of chemicals and solvents.

Another commercially successful epoxy based flooring material described in U. S. Pat. No. 3,794,609, utilizes liquid bisphenol A epoxy and a mixture of powdered methylene dianiline (MDA) and graded silica sand as the second component. The composition has excellent resistance to organic and inorganic acids and a wide variety of chemicals and solvents. However, MDA has recently been identified as a carcinogen and its manufacture and use are being regulated. Further, MDA cured epoxies are not very color stable and darken quickly.

The resistance of epoxy based flooring and coating materials to attack by solvents such as acetone and methanol can be poor. The properties of an epoxy resin based film are dependent on the type of epoxy resin and hardener, the chemical nature of the cure linkage and extent of crosslinking relative to chain extension and cross link density. The most important commercial cure mechanisms use aliphatic amines, polyamides, polyamidoamines, aromatic amines and carboxylic derivatives. Unfortunately, amines and carboxylic derivatives result in cured materials which are generally sensitive to acid and hydrolyric degradation. The structural basis for this susceptibility, when using amine hardeners, is the presence of the substituted nitrogen group in the matrix which can be protonated by acid and undergo a series of degradation reactions. In the case of carboxylic acid derived hardeners, the cured material contains ester linkages which are subject to hydrolysis catalyzed by both acid and base.

Epoxy based coating and flooring materials generally do not have good resistance to weathering in sunlight. While such coatings maintain their chemical and corrosion resistance, exposure to the ultraviolet light component of sunlight results in a surface degradation phenomenon known as chalking which changes both the gloss and color of the original coating. Where color and gloss retention is desired or required, epoxy protective coatings are typically topcoated with a more weatherable coating i.e. an alkyd, vinyl or aliphatic polyurethane coating. The end result is a two or sometimes three coat system which provides corrosion resistance and weatherability, but which is also labor intensive and expensive to apply.

A growing emphasis on compliance with government environmental and health hazard regulations has prompted coating and flooring material manufacturers and end users to evaluate new coating technologies. The Clean Air Act sets limits on both the type and amount of volatile organic compounds (VOC) and has resulted in research directed to higher solids, solventless and waterborne protective coating systems. In addition, as part of the Resource Recovery and Conservation Act, the Environmental Protection Agency has established minimum national standards for the management of hazardous waste. Part of these standards deals with the prevention of waste releases into soil and groundwater through chemically resistant coating, lining and flooring materials in the form of secondary containment structures.

Thus, while epoxy based coating and flooring materials have gained wide commercial acceptance, the need nevertheless remains for epoxy based materials with improved color and gloss retention, better chemical and corrosion resistance, and improved resistance to mechanical abuse. New epoxy coating and flooring materials are needed to comply with new governmental environmental and health hazard regulations. Epoxy coatings and flooring materials with improved color and gloss retention are needed wherever they may be exposed to sunlight. An epoxy coating which doesn't chalk and does not require a weatherable topcoat is desirable. Coating and flooring materials with improved chemical, corrosion, impact and abrasion resistance are needed for both primary and secondary chemical containment structures, for protecting steel and concrete in chemical, power generation, railcar, sewage and waste water treatment, and paper and pulp processing industries. Improved epoxy based flooring materials are needed in industrial environments such as shipping and receiving docks where heavy impact loading can be anticipated, for floors which must be repeatedly cleaned with steam and aggressive chemicals, such as those found in food processing, meat packaging and beverage industries and where spills of caustic, acid and highly reactive chemicals cannot be avoided.

Heretofore, epoxy coatings with improved weatherability have been obtained by modification with acrylic resin or by curing inherently weatherable epoxide resins i.e., sorbitol glycidyl ethers, hydrogenated reaction products of bisphenol A and epichlorhydrin, and more recently the epoxy functional coetherified melamine resins from Monsanto with polyamide, cycloaliphatic amine or carboxyl functional acrylic or polyester resins. Another approach has been to use epoxidized polyester resins in combination with certain carboxyl functional vehicles. While these coatings exhibit improved weatherability, their chemical and corrosion resistance is generally inferior to the epoxy resin based coatings previously described.

Epoxy based flooring materials with improved chemical resistance have been developed from epoxy novalac resins and modified cycloaliphatic and aromatic amine hardeners. Epoxy novalac based flooring materials generally cannot be sprayed at 100% solids because of their high viscosity. Aromatic amine hardeners, i.e. methylene dianiline and diethyltoluene diamine are either carcinogenic or suspect carcinogens. These materials generally have excellent chemical resistance, however, their weatherability is very poor. Discoloration may often occur indoors.

Therefore, it is an object of the present invention to provide modified epoxy based coatings with improved chemical, corrosion and weathering resistance.

Another object of this invention is to provide solventless, modified epoxy based flooring materials with improved resistance to weathering and improved solvent, acid and base resistance and which exhibit high tensile and compressive strength and excellent resistance to impact and abrasion.

SUMMARY OF THE INVENTION

A protective coating embodiment of the composition is prepared by combining the following ingredients:

(a) a resin component based on a blend of (1) a non-aromatic epoxy resin having at least two 1,2-epoxy groups with (2) a polysiloxane and (3) an organooxysilane;

(b) a difunctional amine hardener component which may be substituted wholly or in part with an aminosilane;

(c) an optional catalyst;

(d) a pigment or aggregate component; and (e) water.

A protective flooring embodiment of the composition is prepared by combining the following ingredients:

(a) a resin component based on a blend of (1) an aromatic epoxy resin having at least two 1,2-epoxy groups with (2) a polysiloxane and (3) an organooxysilane;

(b) an amine hardener component which may be substituted wholly or in part with an aminosilane;

(c) an optional catalyst;

(d) a pigment aggregate component; and (e) water.

Coating embodiments of the composition comprise in the range of from about 15–45 percent by weight of the non-aromatic epoxy resin ingredient, 15 to 45 percent by weight polysiloxane, 1 to 10 percent by weight organooxysilane, 10 to 20 percent by weight amine hardener, and up to about 4 percent by weight catalyst.

Flooring embodiments of the composition comprise in the range of from about 5–20 percent by weight of the epoxy resin ingredient, to 10 percent by weight polysiloxane, up to 2 percent by weight organooxysilane, 2 to 5 percent by weight amine hardener, and up to about 4 percent by weight catalyst.

The epoxide resins useful in forming coating embodiments of this invention are non-aromatic hydrogenated resins which contain more than one 1,2-epoxy groups per molecule and more preferably two 1,2-epoxy groups per molecule. The weight per epoxide of such resins are within the range of from 100 to about 2000. Preferably the epoxide resins contain glycidyl ether or ester groups, are liquid rather than solid and have weight per epoxide in the range of from about 100 to about 500. Epoxide resins useful in forming flooring embodiments of this invention include aromatic epoxy resins.

Polysiloxanes useful in coating and flooring embodiments of the present invention have the formula:

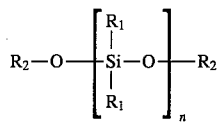

where each $R_1$ is selected from the group consisting of the hydroxy group and alkyl, aryl and alkoxy groups having up to six carbon atoms. Each $R_2$ is selected from the group consisting of hydrogen and alkyl and aryl groups having up to six carbon atoms and wherein n is selected so that the molecular weight of the preferred polysiloxanes may be in the range of from 400 to about 2000.

Organooxysilanes useful in coating and flooring embodiments of the present invention have the formula:

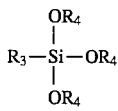

where $R_3$ is selected from the group consisting of aryl, alkyl, and cycloalkyl groups containing up to six carbon atoms and where $R_4$ is independently selected from the group consisting of alkyl, hydroxyalkyl, alkoxyalkyl and hydroxyalkoxyalkyl groups containing up to six carbon atoms. The epoxy resin, polysiloxane and organooxysilane are combined to form the resin component.

The hardener component comprises an amine selected from the general classes of aliphatic amines, aliphatic amine adducts, polyamidoamines, cycloaliphatic amines and cycloaliphatic amine adducts, aromatic amines, Mannich bases and ketimines which may be substituted wholly or in part with an aminosilane having the general formula:

$$Y—Si—(O—X)_3$$

where $Y$ is $H(HNR)_a$ and where a is an integer from two to about six, each R is a difunctional organic radical independently selected from the group consisting of aryl, alkyl, dialkylaryl, alkoxyalkyl, and cycloalkyl radicals, and R can vary within each Y molecule. Each X can be the same or different, and is limited to alkyl, hydroxalkyl, alkoxyalkyl and hydroxyalkoxyalkyl groups containing less than about six carbon atoms. At least 0.7 equivalents of amine or 0.2 moles of aminosilane per equivalent of epoxy are present in the hardener component. Amine hardeners useful in forming coating embodiments of this invention are difunctional, where "a" in the formula set forth above for the aminosilane is one. Amine hardeners useful in forming flooring embodiments of this invention are polyfunctional.

A preferred catalyst is an organotin catalyst having the general formula

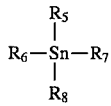

where $R_5$ and $R_6$ are selected from a group consisting of alkyl, aryl, and alkoxy groups having up to eleven carbon atoms, and $R_7$ and $R_8$ are selected from the same groups as $R_5$ and $R_6$, or from a group consisting of inorganic atoms such as halogens, sulphur or oxygen.

The coating embodiment of the composition according to the present invention comprises a fine particle size pigment or aggregate material, preferably with 90 percent by weight greater than 325 mesh U. S. Sieve size. The flooring embodiment of the composition according to the present invention comprises a coarse or a mixture of coarse and fine particle size aggregate material, preferably at least about 85 percent by weight of the aggregate component will be between 10 and 200 U. S. Sieve size.

Water should also be present in an amount sufficient to bring about hydrolyric polycondensation of polysiloxane and silane. The coating and flooring embodiments of the composition of the present invention may additionally contain certain catalysts to improve cure time, solvents to improve spray atomization and application, and rheological modifiers to improve flow characteristics.

Curing of the coating and flooring embodiments of the compositions involve the simultaneous reaction of the epoxy resin with the polyamine to form a cured linear epoxy polymer, hydrolysis of the polysiloxane and/or organooxysilane to form silanol, and the polycondensation of silanol to form an epoxy-modified polysiloxane polymer. The compositions formed by combining the above-identified ingredients can be cured in situ on the surface of a substrate is desired.

DETAILED DESCRIPTION

The present invention provides an epoxy-modified polysiloxane coating and flooring material with improved properties. When formulated as a coating material, compositions of the present invention have greatly improved resistance to ultraviolet light and weathering in sunlight as well as improved chemical and corrosion resistance when compared to conventional epoxy resin based coatings. Coatings of the present invention have color and gloss retention approaching those exhibited by aliphatic polyurethanes and may, depending on application, obviate the need for topcoating. Chemical resistance is also improved over the prior art. The enhanced weatherability is believed to be due to the formation of a linear epoxy polymer structure, rather than a cross-linked epoxy structure, as will be discussed in greater detail below.

When formulated as a flooring material, compositions of the present invention have greatly improved chemical resistance and compressive strength and exhibit high tensile strength and impact resistance compared to prior art epoxy flooring materials and surfacers.

The epoxy polysiloxane coating embodiment of the composition is prepared by combining in the presence of water;

(a) a resin component comprising a non-aromatic epoxide resin, polysiloxane and organooxysilane;

(b) a hardener component;

(c) an organotin optional catalyst; and (d) a pigment and/or aggregate component.

The epoxy flooring embodiment of the composition is prepared by combining in the presence of water;

(a) a resin component comprising an aromatic epoxy resin, polysiloxane and an organooxysilane;

(b) a hardener component;

(c) an optional organotin catalyst; and (d) a pigment and/or aggregate component.

The coating and flooring composition may also contain other components such as, rheological modifiers, plasticizers, thixotropic agents, antifoam agents and solvents and the like to achieve the desired properties sought by the user.

With respect to the resin component, it comprises a blend of epoxide resin, polysiloxane and organooxysilane. Suitable epoxy resins useful in forming coating embodiments of this invention are non-aromatic hydrogenated epoxy resins that contain more than one and preferably two 1,2-epoxy groups per molecule. Preferably, the epoxide resins are liquid rather than solid, have an epoxide equivalent weight of about 100 to about 2,000, and more preferably in the range of from about 100 to 500 and have a reactivity of about two.

Preferred epoxide resins are non-aromatic hydrogenated cyclohexane dimethanol and diglycidyl ethers of hydrogenated Bisphenol A-type epoxide resin, such as Epon DPL-862, Eponex 1510, Heloxy 107 and Eponex 1513 (hydrogenated bisphenol A-epichlorohydrin epoxy resin) from Shell Chemical in Houston, Tex.; Santolink LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N. Y.; Epirez 505 from Rhone-Poulenc located in Lousiville, Ky.; Aroflint 393 and 607 from Reichold located in Pensacola, Fla.; and ERL4221 from Union Carbide located in Tarrytown, N. Y. Other suitable non-aromatic epoxy resin include DER 732 and DER 736. Such non-aromatic hydrogenated epoxide resins are desired for their limited reactivity of about two, which promote formation of a linear epoxy polymer and prohibits formation of a cross-linked epoxy polymer. It is believed that the resulting linear epoxy polymer formed by adding the hardener to the epoxide resin is responsible for the enhanced weatherability of this composition.

The use of such non-aromatic epoxy resins to form a weatherable protective coating has never before been explored because of the limited reactivity of the epoxide resin and, therefore, the perceived inability of the resin to cure to form a protective coating.

A preferred coating composition comprises in the range of from 15 to 45 percent by weight epoxide resin. If the coating composition comprises less than 15 percent by weight epoxide resin, chemical resistance of the coating will be compromised. If the coating composition comprises greater than 45 percent by weight epoxide resin, the weatherability of the coating will be compromised. A particularly preferred coating composition comprises approximately 25 percent by weight non-aromatic epoxide resin.

Preferred epoxide resins for flooring materials, surfacers, are blends of Shell Epon 828 (bisphenol A-epichlorohydrin epoxy resin) with difunctional epoxide reactive diluents such as neopentylglycol diglycidylether, resorcinol diglycidyletherandcyclohexanedimethanoldiglycidylether, bisphenol F epoxy resins i.e., Shell Epon DPL 862 (bisphenol F-epiclorohydrin epoxy resin) and epoxy phenol novalac resins such as: Epalloy 8250 (epoxy novalac resin) from CVC located in Cherry Hill, N. J.; Araldite EPN 1139 from Ciba Geigy; and DEN432 and DEN438 from Dow Chemical. These epoxy resins display good chemical resistance. A particularly preferred epoxy resin for flooring and surfacer compositions is Epalloy 8250.

A preferred flooring composition comprises in the range of from 5 to 20 percent by weight epoxide resin. If the flooring composition comprises less than five percent by weight epoxide resin resistance to alkaline chemicals will be compromised. Additionally, the cost to manufacture the composition using an offsetting amount of polysiloxane and organooxysilane would be prohibitive. If the flooring composition comprises greater than 20 percent by weight epoxide resin, its resistance to organic acid and solvent would be less than desirable. A particularly preferred composition comprises approximately 15 percent by weight epoxide resin.

With respect to the polysiloxane used to make up the resin component, preferred polysiloxanes include, but are not limited to, those having the following formula:

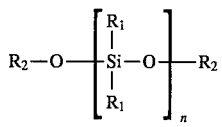

where each $R_1$ is selected from the group consisting of the hydroxy group and alkyl, aryl, and alkoxy groups having up to six carbon atoms. Each $R_2$ is selected from the group consisting of hydrogen and alkyl and aryl groups having up to six carbon atoms. It is preferred that $R_1$ and $R_2$ comprise groups having less than six carbon atoms to facilitate rapid hydrolysis of the polysiloxane, which reaction is driven by the volatility of the alcohol analog product of the hydrolysis. $R_1$ and $R_2$ groups having greater than six carbon atoms tend to impair the hydrolysis of the polysiloxane due to the relatively low volatility of each alcohol analog. Methoxy, ethoxy and silanol functional polysiloxanes having n selected molecular weights are about 400 to about 2000 which are preferred for formulating coating and flooring materials of the present invention. Methoxy, ethoxy and silanol functional polysiloxanes having molecular weights of less than 400 would produce a coating and flooring composition that would be brittle and offer poor impact resistance. Methoxy, ethoxy and silanol functional polysiloxanes having molecular weights of greater than 2000 produce a coating and flooring composition having both a viscosity outside the desired range of from about 3,000 to 15,000 centipoise (cP) at 20° C., and are too viscous for application without adding solvent in excess of current volatile organic content (VOC) requirements.

Especially preferred methoxy functional polysiloxanes are: DC-3074 and DC-3037 from Dow Corning; GE SR191 and SY-550 from Wacker located in Adrian, Mich. Silanol functional polysiloxanes include, but are not limited to, Dow Corning's DC840, Z6018, Q1-2530 and 6-2230 intermediates. A preferred coating composition comprises in the range of from 15 to 45 percent by weight polysiloxane. A preferred flooring composition comprises in the range of from one to ten percent by weight polysiloxane. If the coating and flooring composition comprises an amount of polysiloxane outside each range, the coating and flooring composition produced will display inferior weatherability and chemical resistance. A particularly preferred coating composition comprises approximately 30 percent by weight polysiloxane. The preferred flooring composition comprises approximately 3 percent by weight polysiloxane.

With respect to organooxysilane used to make up the resin component, preferred organooxysilanes have the general formula.

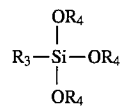

where $R_3$ is selected from the group consisting of alkyl and cycloalkyl groups containing up to six carbon atoms and aryl groups containing up to ten carbon atoms. $R_4$ is independently selected from the group consisting of alkyl, hydroxyalkyl, alkoxyalkyl and hydroxyalkoxyalkyl groups containing up to six carbon atoms. It is preferred that $R_4$ comprise groups having up to six carbon atoms to facilitate rapid hydrolysis of the organooxysilane, which reaction is driven by the evaporation of the alcohol analog product of the hydrolysis. $R_4$ groups having greater than six carbon atoms tend to impair the hydrolysis of the organooxysilane due to the relatively low volatility of each alcohol analog.

Particularly preferred organooxysilanes are trialkoxysilanes such as Union Carbide's A-163 (methyl trimethoxy silane), A-162 and A-137, and Dow Corning's Z6070 and Z6124. A preferred coating composition comprises in the range of from one to ten percent by weight organooxysilane. A preferred flooring composition comprises up to about two percent by weight organooxysilane. If the coating and flooring composition comprises an amount of organooxysilane outside each range, the coating and flooring composition produced will display inferior impact resistance and chemical resistance. A particularly preferred coating composition comprises approximately five percent by weight organooxysilane. The preferred flooring composition comprises approximately 0.7 percent by weight organooxysilane.

Accordingly, a preferred coating composition according to practice of this invention may comprise a weight ratio of polysiloxane to organooxysilane of approximately six to one. A preferred flooring composition may comprise a weight ratio of polysiloxane to organooxysilane of approximately four to one.

The hardener component comprises an amine chosen from the general classes of aliphatic amines, aliphatic amine adducts, polyamidoamines, cycloaliphatic amines and cycloaliphatic amine adducts, aromatic amines, Mannich bases and kerimines which may be substituted wholly or in part with an aminosilane having the general formula:

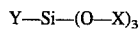
Y—Si—(O—X)$_3$ where Y is H(HNR)$_a$ and where one, each R is a difunctional organic radical independently selected from the group consisting of aryl, alkyl, dialkylaryl, alkoxyalkyl, and cycloalkyl radicals, and R can vary within each Y molecule. Each X can be the same or different, and is limited to alkyl, hydroxalkyl, alkoxyalkyl and hydroxyalkoxyalkyl groups containing less than about six carbon atoms. At least 0.7 equivalents of amine or 0.2 moles of aminosilane per equivalent of epoxy may be present in the hardener component.

Preferred aminosilanes include, but are not limited to: aminoethyl aminopropyl triethoxysilane, n-phenylaminopropyl trimethoxysilane, trimethoxysilylpropyl diethylene triamine, 3-(3-aminophenoxy) propyl trimethoxy silane, amino ethyl amino methyl phenyl trimethoxy silane, 2 amino ethyl 3 aminopropyl, tris 2 ethyl hexoxysilane, n-aminohexyl aminopropyl trimethoxysilane and trisaminopropyl trismethoxy ethoxy silane.

The manufacturers and trade names of some aminosilanes useful in the present invention are listed in Table 1

TABLE 1

| Aminosilanes | |
|---|---|
| Manufacturer | Product Designation |
| Dow Corning | Z6020, XI-6100, XI6150 |
| Union Carbide | A1100, A1101, A1102, A1108, A1110, A1120 A1126, A1130, A1387, Y9632 |
| Wacker | ED117 |
| H$ls | A0696, A0698, A0699, A0700, A0710, A0720, A0733, A0733, A0742, A0750, A0800 |
| PCR | 12328-1 |

The hardener component for a preferred coating composition comprises a difunctional aminosilane having the general formula:

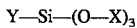
Y—Si—(O—X)$_3$ where Y is H(HNR)$_a$ and where a is one, R is a difunctional organic radical independently selected from the group consisting of aryl, alkyl, dialkylaryl, alkoxyalkyl, and cycloalkyl radicals, where X is limited to alkyl, hydroxalkyl, alkoxyalkyl and hydroxyalkoxyalkyl groups containing less than about six carbon atoms. At least 0.7 equivalents of amine or 0.2 moles of aminosilane per equivalent of epoxy may be present in the hardener component.

Preferred aminosilanes are difunctional silanes including aminopropyltrimethoxysilane and aminopropyltriethoxysilane. A particularly preferred aminosilane for coating compositions of the present invention is Union Carbide A1100.

A difunctional aminosilane is desired because such aminosilanes have a reactivity of two, i.e., have only two amine hydrogens, that reacts with the non-aromatic expoxy, also having a reactivity of two, to form a linear non-cross linked epoxy polymer having improved weatherability.

These amines and aminosilanes are preferred because they produce coating compositions exhibiting superior weatherability in terms of both color and gloss retention. A preferred coating composition comprises in the range of from 10 to 20 percent by weight amine and/or aminosilane. If the coating composition comprises an amount of amine or aminosilane outside this range, a coating composition having inferior weatherability and chemical resistance will be produced. A particularly preferred coating composition comprises approximately 15 percent by weight amine and/or aminosilane.

The preferred polyamines and aminosilanes for flooring and concrete surfacer compositions of the present invention are aliphatic amines, methylene bis dianiline, diethyltoluene diamine, methylene bis diethylaniline, methylene bis diisopropylaniline, Versamine I70 and 671CE from Henkel located in Ambler, Pa., Ciba Geigy's XUHY350, XUHY310, and XUHY315, Pacific Anchor's Ancamine 2264, 2280, and 2168, NC541 from Cardolite located in Newark, N. J., Euredur 3265 and 3266 from Schering Berlin located in Dublin, Oh., Hüls' AO698, and 12328-1 from PCR located in Gainsville, Fla. These polyamines and aminosilanes are preferred because they produce flooring compositions having superior chemical resistance. A particularly preferred aminosilane for chemically resistant flooring compositions is Dow Corning's Z6020 (aminoethyl aminopropyl trimethoxy silane). A preferred flooring composition comprises in the range of from two to five percent by weight polyamine or aminosilane. If the flooring composition comprises an amount of polyamine or aminosilane outside this range, a flooring composition having inferior weatherability and chemical resistance will be produced. A particularly preferred flooring composition comprises approximately four percent by weight polyamine or aminosilane.

Accordingly, a preferred coating composition according to practice of the present invention may comprise a weight ratio of polysiloxane to amine and aminosilane of approximately two to one. A preferred flooring composition may comprise a weight ratio of polysiloxane to polyamine and/or aminosilane of approximately three to four. Additionally, a preferred coating may comprise a weight ratio of amine and aminosilane to organooxysilane of approximately three to one. A preferred flooring composition may comprise a weight ratio of polyamine and aminosilane to organooxysilane of approximately six to one.

In the modified epoxy based coating and flooring compositions of the present invention, the proportion of hardener component to resin component can vary over a wide range, regardless of whether the amine hardener is chosen from the general classes of amines, or an aminosilane of the general formula above, or any combination thereof. In general, the epoxy resin component is cured with sufficient amine hardener to provide at least from about 0.7 to about 1.2 amine equivalent weight per 1 epoxide equivalent weight or with at least 0.2 moles of aminosilane per epoxide equivalent weight. If the amount of amine hardener added provides less than 0.7 amine equivalent weight per epoxide equivalent weight, the coating and flooring composition produced will exhibit a slow cure time and have inferior weatherability and chemical resistance. If the amount of amine hardener added provides greater than 1.2 amine equivalent weight per epoxide equivalent weight, the coating and flooring composition produced will exhibit surface blushing or greasiness.

With respect to the pigment or aggregate component, the present invention embraces two principal embodiments that are dependant on whether the composition is used as a coating or a flooring.

In the first embodiment, the modified epoxies of the present invention are formulated for application with conventional air, airless, air-assisted airless and electrostatic spray equipment, brush or roller and are intended for use as protective coatings for steel, galvanizing, aluminum, concrete and other substrates at dry film thicknesses in the range of from 25 micrometers to about two millimeters. Accordingly, the pigment or aggregate is a fine particle size material, preferably with at least 90 weight percent greater than 325 mesh U. S. sieve size, and is selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like.

A preferred coating composition comprises up to 50 percent by weight fine particle size aggregate. If a clear coating composition is desired the coating composition may be prepared without the pigment or aggregate component. Clear coating compositions may be used as decorative finish coat or as a sealing coat in flooring compositions. If the coating composition comprises less than about ten percent by weight fine particle size aggregate the raw material cost is generally too high and the coating composition produced exhibits poor hiding power, i.e., it may not cover in one coat. If the coating composition comprises greater than 50 percent by weight fine particle size aggregate the coating composition produced is too viscous for application. A particularly preferred coating composition comprises approximately 20 percent by weight fine particle size aggregate.

The pigments or aggregates are typically added to the epoxy resin portion of the resin component and dispersed with a Cowles mixer to at least 3 Hegman fineness of grind or alternatively ball milled or sand milled to the same fineness of grind before addition of polysiloxane and organooxysilane components. Selection of a fine particle size pigment or aggregate and dispersion or milling to about 3 Hegman grind allows atomization of mixed resin and cure components with conventional air, air-assisted airless, airless and electrostatic spray equipment and provides a smooth, uniform surface appearance after application.

In the other embodiment of the present invention, the modified epoxies are formulated as flooring materials or surfacers and the pigment or aggregate comprise a mixture of coarse and fine particle sizes. At least from about 85 percent to about 95 percent of the pigment or aggregate component has between 10 and 200 mesh U. S. sieve size (coarse) and from about 5 to about 15 percent is greater than 325 mesh U. S. sieve size (fine). A range or mixture of aggregate sizes is used to improve packing efficiency and optimizes the amount of low cost aggregate used to produce the composition. The fine sized aggregate particles can be thought of as filling in the spatial voids between the coarse sized aggregate. The integration of fine and coarse sized aggregate helps to improve the compressive strength of the flooring material.

Preferred coarse aggregates are aluminum oxide, garnet, pumice and silica sand. Preferred fine particle size aggregates includes those previously described for the first embodiment. A preferred flooring composition comprises in the range of from 50 to 90 percent by weight aggregate material. If the flooring composition comprises less than 50 percent by weight aggregate the offsetting raw material cost will be too high and the flooring composition produced will exhibit poor compressive strength. If the flooring composition comprises greater than 90 percent by weight aggregate the flooring composition produced will be too viscous to permit application. A particularly preferred flooring composition comprises approximately 70 percent by weight aggregate material.

The coarse particle size pigment or aggregate component can be mixed with the resin component to form a two-package system or packaged as a separate, third component or any combination thereof. The modified epoxy flooring materials of the present invention are typically applied at 0.06 to 0.50 inches (1.5 to 13 millimeters) in thickness using roller, trowel and screed application methods.

Water is an important ingredient of the present invention and should be present in an amount sufficient to bring about both the hydrolysis of the organooxysilane and/or the polysiloxane and the subsequent condensation of the silanols. The sources of water are mainly atmospheric humidity and adsorbed moisture on the pigment or aggregate material. Additional water may be added to accelerate cure depending on ambient conditions, such as the use of the coating and flooring composition in arid environments. A preferred coating and flooring composition comprises up to a stoichiometric amount of water to facilitate hydrolysis. Coating and flooring compositions prepared without added water may not contain the amount of moisture needed for the hydrolysis and condensation reactions, and may therefore produce a coating and flooring composition having an insufficient degree of ultraviolet, corrosion and chemical resistance. Coating and flooring compositions comprising greater than about two percent by weight water tend to hydrolyze and polymerize to form an undesirable gel before application. A particularly preferred coating and flooring composition comprises approximately one percent by weight water.

If desired, water may be added to either the epoxide resin or polyamine hardener. Other sources of water may include trace amounts present in the epoxide resin, polyamine hardener, thinning solvent, or other ingredients. Water may also be incorporated by using kerimines or alcohol-solvent-water mixtures as described in U. S. Pat. No. 4,250,074 herein incorporated by reference. Regardless of its source, the total amount of water contained in a particularly preferred coating and flooring composition should be the stoichiometric amount needed to facilitate the hydrolysis reaction. Water exceeding the stoichiometric amount is undesirable since excess water acts to reduce the surface gloss of the coating or flooring composition.

Up to four percent by weight catalyst may be added to the resin component or as an entirely separate component to speed drying and curing of the modified epoxy coating and flooring materials of the present invention. Useful catalysts include metal driers well known in the paint industry e.g. zinc, manganese, cobalt, iron, lead and tin, each in the form of octoates, neodecanates and napthenates. Suitable catalysts include organotin catalysts having the general formula

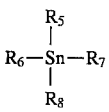

where $R_5$ and $R_6$ are selected from a group consisting of alkyl, aryl, and alkoxy groups having up to eleven carbon atoms, and $R_7$ and $R_8$ are selected from the same groups as $R_5$ and $R_6$, or from a group consisting of inorganic atoms such as halogens, sulphur or oxygen. Dibutyl tin dilaurate, dibutyl tin diacetate, organotitanates, sodium acetate, and aliphatic secondary or tertiary polyamines including propylamine, ethylamino ethanol, triethanolamine, triethylamine, and methyl diethanoi amine may be used alone or in combination to accelerate hydrolytic polycondensation of polysiloxane and silane. A preferred catalyst is dibutyl tin dilaurate.

Modified epoxy coatings of the present invention are generally low in viscosity and may be spray applied without addition of solvent. However, organic solvents may be added to improve atomization and application with electrostatic spray equipment or to improve flow and leveling and appearance when applied by brush, roller, or standard air and airless spray equipment. Exemplary solvents include esters, ethers, alcohols, ketones, glycols and the like. The maximum amount of solvent added to the coating or flooring composition of the present invention is limited by government regulation under the Clean Air Act to approximately 420 grams solvent per liter of the coating or flooring composition.

The epoxy polysiloxane coating and flooring composition of the present invention may also contain rheological modifiers, plasticizers, antifoam agents, thixotropic agents, pigment wetting agents, bituminous and asphaltic extenders, antisettling agents, diluents, UV light stabilizers, air release agents and dispersing aids. A preferred coating and flooring composition may comprise up to about ten percent by weight such modifiers and agents.

The epoxy polysiloxane coating composition of the present invention is supplied as a two package system in moisture proof containers. One package contains the epoxide resin, polysiloxane, organooxysilane and pigment or aggregate component, additives and solvent if desired. The second package contains polyamine and/or aminosilane and optionally catalysts or accelerating agents.

The epoxy polysiloxane flooring or surfacer composition of the present invention is typically supplied as three package systems in moisture proof containers. The first package contains epoxide resin, polysiloxane, organooxysilane, color pigments and additives. The second package contains polyamine and/or aminosilane hardeners and catalysts if desired. The remaining package is a coarse or mixture of coarse and fine particle size pigments or aggregates.

The epoxy polysiloxane coating and flooring composition of the present invention can be applied in ambient temperatures in the range of from $-6°C$ to $50°C$. At temperatures below $-18°C$ cure is severely retarded. However, the coating and flooring composition of the present invention may be applied under bake or cure temperatures up to $150°C$ to $200°C$.

While not wishing to be bound by any particular theory, it is believed that the curing of the modified epoxy coating and flooring materials of the present invention involves the reaction of an epoxide resin with polyamine to form a cured epoxy polymer, and hydrolyric polycondensation of polysiloxane and organooxysilane to produce alcohol and a polysiloxane polymer. When an aminosilane is utilized to make up the hardener component, the amine moiety of the aminosilane undergoes the epoxy-amine addition reaction and the silane moiety of the aminosilane undergoes hydrolytic polycondensation. In their cured form, the modified epoxy coating and flooring materials of the present invention exist as linear epoxy-modified polysiloxane which have substantial advantages over conventional epoxy systems.

In a preferred coating composition, the non-aromatic epoxy rein reacts with the difunctional aminosilane to form a linear epoxy polymer that combines with the polysiloxane to form an epoxy-modified polysiloxane coating via insutu formation of a linear cycloaliphatic/aliphatic epoxide polymer with pendant alkoxy silane groups.

The isolated reaction of epoxide resin and polyamine, to form cured epoxy is believed to be as follows:

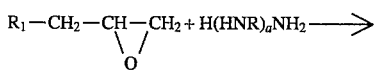

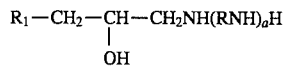

The secondary amine hydrogens may also react as follows:

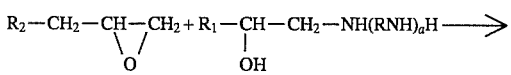

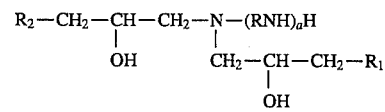

Hydrolyric polycondensation reactions of organooxysilanes and polysiloxanes of the present invention are believed to occur in a stepwise fashion. The first reaction is hydrolysis of organooxysilane e.g., trialkoxysilane or methoxy functional polysiloxane, in the presence of water and catalyst to form the corresponding silanols with liberation of alcohol as illustrated in Reaction 1.

Reaction 1

Hydrolysis of Organooxysilane i.e., Trialkoxysilane

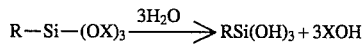

and/or

Hyrdolysis of Alkoxy Functional Polysiloxane

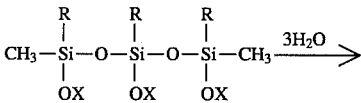

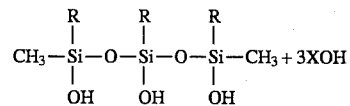

The second reaction involves the condensation of the silanols produced by the hydrolysis of organooxysilane and polysiloxane i.e. trialkoxysilane and alkoxy functional polysiloxane, to form polysiloxane and water Reaction 2
Silanol Condensation

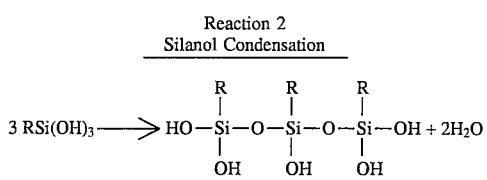

Both reaction rates are strongly pH dependent, but under optimum conditions hydrolysis and condensation begin to occur within minutes. The same factors which accelerate hydrolysis of alkoxysilanes and condensation of silanols also accelerate condensation of silanol and their alkoxysilane and methoxy functional polysiloxane precursors. The overall pathway for the hydrolysis and full condensation of organooxysilane and polysiloxane is complicated. Presented in FIG. 1 is a model for trialkoxysilane hydrolysis and condensation reproduced from the Hüls Corporation Silicon Compounds Register and Review.

The coating composition prepared by combining a difunctional aminosilane with a non-aromatic epoxy resin displaces improved resistance to caustic, is weatherable, allows infinate recoatability, provides abrasion resistance better than a polyurethane (which is completely unpredictable because siloxane polymers and epoxy polymers have terrible abrasion resistance).

The coating and flooring compositions of the present invention are capable of achieving complete cure at an ambient temperature range of from −6° C. to 50° C. However, some applications of the coating or flooring composition of the present invention may achieve complete cure during a baking process at temperatures up to 150° C. to 200° C.

The coating and flooring compositions of the present invention exhibits an unexpected and surprising improvement in chemical corrosion and weathering resistance as well as high tensile and compressive strength and excellent impact and abrasion resistance.

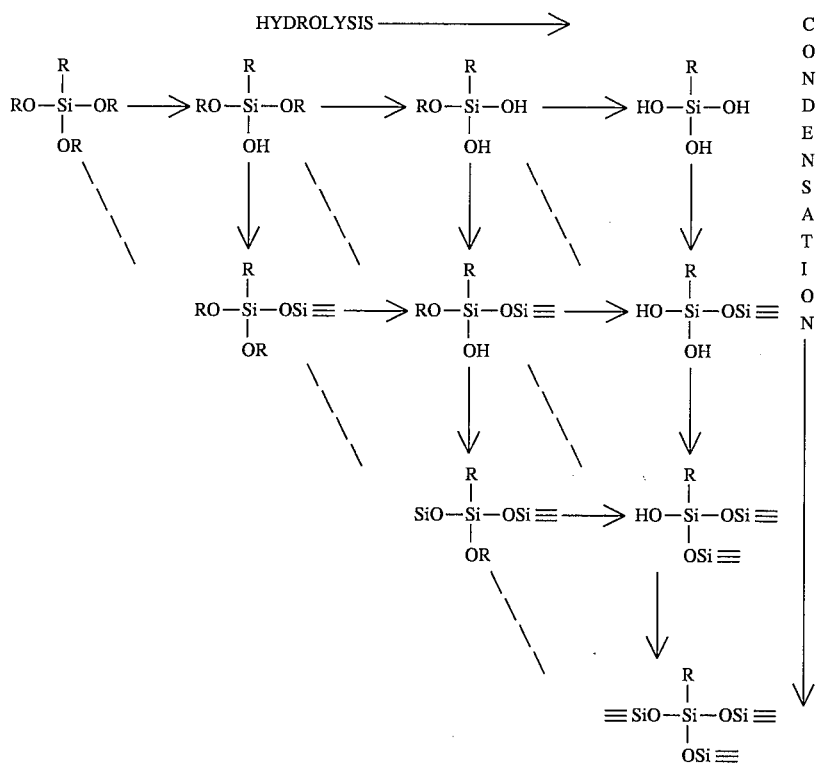

FIG. 1

The silanols generated from hydrolysis of alkoxysilane may also condense with hydroxyl groups available on the surface of siliceous pigments or aggregates such as ground glass, quartz and silica. The same silanols may also condense with the hydroxyl groups formed from reaction of epoxide resin and polyamine.

Ultimately, the chemical and physical properties of the epoxy polysiloxane coating and flooring materials of the present invention are affected by judicious choice of epoxy resin, organooxysilane, polysiloxane, polyamine or aminosilane hardener and pigment or aggregate components as well as the relative rates of reaction of epoxy resin with hardener and hydrolyric polycondensation of organooxysilane and polysiloxane.

These and other features of the present invention will become more apparent upon consideration of the following examples. Refer to Table 2 for a description of the ingredients used in Examples 1 through 9. In each example, the ingredients used are combined in the proportions described by weight in grams.

TABLE 2

| Ingredient | Description |
| --- | --- |
| Epon 828 | Shell epoxy resin. Eq. Wt. = 190 |
| Epon DPL862 | Shell epoxy resin. Eq. Wt. = 165 |
| Eponex 1513 | Shell epoxy resin. Eq. Wt. = 230 |
| Epalloy 8250 | CVC epoxy resin. Eq. Wt. = 170 |

TABLE 2-continued

| Ingredient | Description |
| --- | --- |
| Epodil 757 | Pacific Anchor cyclohexanedimethanol diglycidyl ether |
| Aroflint 607 | Reichold epoxide resin |
| A-163 | Carbide methyl trimethoxysilane |
| DC-3074 | Dow Corning methoxy functional polysiloxane |
| A-1100 | Carbide aminopropyl trimethoxysilane |
| Y-9632 | Carbide proprietary aminosilane |
| Z6020 | Dow Corning aminoethyl aminopropyl trimethoxy silane |
| ED-117 | Wacker proprietary aminosilane |
| Euredur 3265 | Schering Berlin polyamine Eq. Wt. = 400 |
| Ancamine 1942 | Pacific Anchor polyamine Eq. Wt. = 70 |
| DCH-99% | Dupont diaminocyclohexane |
| Araldite R972 | Ciba Geigy methylene bis dianiline Eq. Wt. = 48 |
| Nuosperse 657 | Pigment wetting agent |
| Tioxide RTC 60 | Titanium dioxide |
| F-75 | 40 mesh silica sand |
| Crystal Silica #70 | 70 mesh silica sand |
| Silcosil 325 | U.S. Silica silica flour |
| Dislon 6500 | King Industries thixotrope |
| BYK 080 | BYK-Chemie defoamer |

EXAMPLES 1 THROUGH 4

Examples 1 through 4 describe the preparation of the resin component and the combination of the pigment or aggregate material of the present invention as used for coating purposes. In each example, the types and proportions of ingredients used to make up the resin and pigment blend are slightly varied. A portion of each resin and pigment blend as prepared in each example is then combined with a various hardener components and solvents in different proportions as shown in Table 3. Each resulting coating composition was tested for cure time, weathering resistance, corrosion resistance and chemical resistance as shown in Table 3.

EXAMPLE 1

A resin and pigment blend was prepared by combining 385 grams of Eponex 1513 (epoxide resin), 5 grams of Nuosperse 657 (pigment wetting agent), 5 grams of BYK 080 (antifoam agent), 10 grams of Dislon 6500 (thixotropic agent) and 338 grams of Tioxide RTC60 (titanium dioxide). The ingredients were added to a one quart can and dispersed to 5 Hegman fineness of grind using an air-motor powered Cowles dissolver. This required about 20 minutes, after which time 25 grams A-163 (trimethoxysilane) and 432 grams DC-3074 (polysiloxane) were added and the combined mixture was then stirred until uniform. The resin blend had a Brookfield viscosity of approximately 10,000 cP at 70° F. (20° C.) and a calculated equivalent weight of 315 grams per equivalent.

EXAMPLE 2

A resin and pigment blend was prepared by combining 390 grams of Epodil 757 (epoxide resin), 5 grams of Nuosperse 657 (pigment wetting agent), 5 grams of BYK 080 (antifoam agent), 10 grams of Dislon 6500 (thixotropic agent) and 338 grams of Tioxide RTC 60 (titanium dioxide). The ingredients were added to a one quart can and dispersed to 5 Hegman fineness of grind using an air-motor powered Cowles dissolver. This required about 20 minutes, after which 10 grams A-163 (trimethyoxysilane) and 432 grams DC-3074 (polysiloxane) were added and the combined mixture was stirred until uniform. The resin blend had a Brookfield viscosity of approximately 3,800 cP at 70° F. (20° C.) and a calculated equivalent weight of 265 grams per equivalent.

EXAMPLE 3

The same ingredients and procedure used to prepare the resin and pigment blend of Example 1 was used, except that 356 grams of Aroflint 607 (epoxide resin) were used instead of 385 grams of Eponex 1513 (epoxide resin). The resin blend had a Brookfield viscosity of approximately 6,800 cP at 70° F. (20° C.) and a calculated equivalent weight of 338 grams per equivalent.

COMPARISON EXAMPLE 4

A resin and pigment blend was prepared by combining 711 grams of Epon 828 (epoxide resin), 5 grams of Nuosperse 657 (pigment wetting agent), 5 grams of BYK 080 (antifoaming agent), 10 grams of Dislon 6500 (thixotropic agent) and 338 grams of Tioxide RTC 60 (titanium dioxide). The ingredients were added to a 1 quart can and dispersed to less than 5 Hegman fineness of grind using an air-motor powered Cowles dissolver. The mixture was thinned with 100 grams of xylene to reduce viscosity and then mixed until uniform. The resin blend had a Brookfield viscosity of approximately 12,000 cP at 70° F. (20° C.) and the calculated equivalent weight was 313 grams per equivalent.

Three hundred grams of the resin blend of Example 1 was mixed with 48 grams of Union Carbide A-1100 (aminopropyl trimethoxysilane) and 20 grams of butyl acetate (organic solvent). The mixture was then spray applied to sandblasted steel test panels using a DeVilbiss air-atomizing spray gun. The epoxy polysiloxane coating dried to touch in less than one hour and was dry through in about eight hours. The coating composition displayed initial 60° gloss of 90.

The resin blends of Examples 1, 2 and 3 and Comparison Example 4 were mixed with the hardeners and solvents shown in Table 3 and applied to test panels in a similar manner.

The epoxy polysiloxane coating composition prepared according to Table 3 were tested for curing time, weathering resistance, corrosion resistance and chemical resistance according to the following ASTM and industry test methods:

1. ASTM G53, sometimes called QUV accelerated weathering, is an accelerated test intended to simulate the deterioration of coatings caused by sunlight and water as rain or dew. Test panels are exposed to alternating ultraviolet light and condensing humidity cycles. Degradation is measured by loss of gloss or rusting or blistering of the coating.

2. ASTM B117 measures the corrosion resistance of coated panels exposed to salt spray (fog) under prescribed conditions. Panels are checked periodically and rated for blistering and rusting according to ASTM D1654. The rating test method uses a 1 to 10 scale with 10 indicating no change.

3. Chemical Resistance, Union Carbide Method C117, measures the resistance of coatings to ten different reagents. One milliliter of each reagent is placed on the test coating and covered with a watch glass. After 24 hours, the reagents are removed and any change is rated on a scale of 1 to 10 with 10 indicating no change, 8 indicating some change, 6 indicating major change, 4 indicating partial failure and 2 indicating complete failure.

Gloss retention in QUV accelerated weathering, salt fog testing and chemical spot tests clearly show that epoxy polysiloxane coatings compositions of the present invention have improved chemical, corrosion and weathering resistance compared to conventional epoxy coatings compositions.

TABLE 3

COATING COMPOSITION

| | Weight (grams) | | | | | | |
|---|---|---|---|---|---|---|---|
| Example 1 | 300 | 300 | 300 | 300 | — | — | — |
| Example 2 | — | — | — | — | 300 | — | — |
| Example 3 | — | — | — | — | — | 300 | — |
| Comparison Example 4 | — | — | — | — | — | — | 300 |
| butyl acetate | 20 | 20 | 20 | 20 | 15 | 20 | 25 |
| A1100 | 48.3 | — | — | — | 57.9 | — | — |
| ED-117 | — | 54.9 | — | — | — | — | — |
| Y-9632 | — | — | 48.0 | — | — | 45.0 | — |
| DCH-99% | — | — | — | 15.0 | — | — | — |
| Versamid 125 | — | — | — | — | — | — | 86.3 |
| Test Results | | | | | | | |
| Dry film thickness (mm) | 6 | 6 | 6 | 6 | 6 | 6 | 6 |
| Dry to touch (hours) | 1 | 1 | 1.2 | 1.5 | 1.5 | 1 | 1.5 |
| Dry through (hours) | 8 | 6 | 10 | 16 | 16 | 12 | 20 |
| QUV Accelerated Weathering | | | | | | | |
| 60° gloss -initial | 90 | 91 | 90 | 86 | 75 | 22 | 65 |
| 1 day | — | 91 | 91 | 65 | — | — | 3 |
| 7 days | 52 | 90 | 66 | 48 | 58 | 13 | 1 |
| 21 days | — | 75 | 36 | — | — | — | — |
| Salt Fog - (1000 hours) | | | | | | | |
| blistering | 10 | 10 | — | — | — | — | 10 |
| rusting | 10 | 10 | — | — | — | — | 8 |
| Chemical Resistance | | | | | | | |
| NaOH (50%) | 10 | 10 | — | — | — | — | 10 |
| HCl (conc.) | 10 | 10 | — | — | — | — | 8 |
| H$_2$SO$_4$(conc.) | 10 | 10 | — | — | — | — | 4 |
| phenol | 8 | 8 | — | — | — | — | 4 |
| H$_3$PO$_4$(conc.) | 10 | 10 | — | — | — | — | 6 |
| NH$_4$OH | 10 | 10 | — | — | — | — | 10 |
| ethanol | 10 | 10 | — | — | — | — | 10 |
| acetic acid(conc.) | 8 | 8 | — | — | — | — | 4 |
| cumene | 10 | 10 | — | — | — | — | 10 |
| acetone | 10 | 10 | — | — | — | — | 10 |

EXAMPLES 5 THROUGH 9

Examples 5 through 9 describe the preparation of the epoxy polysiloxane composition of the present invention as used for flooring or surfacer purposes. The flooring compositions are prepared using the ingredients and in the proportion in grams as shown in Table 4. Each flooring composition was prepared by adding the ingredients to a 1 quart can and mixing with a Jiffy mixer until uniform. Each flooring composition was trowel applied at one eighth inch thickness onto 4"×12"×1/8" sandblasted steel panels for chemical spot tests and impact testing. Tensile, flexural and compressive strength specimens were cast into the corresponding ASTM molds. Testing was conducted after 7 days cure at 70° F. (20° C.) and 50% relative humidity. Chemical resistance was tested using by using Union Carbide Method C117. Direct impact, compressive, tensile and flexural strength was tested using the following ASTM test methods:

1. ASTM G14 determines the energy required to rupture a surfacer or flooring system and is a measure of its ability to withstand mechanical damage in service.
2. ASTM C-307 Tensile Strength, ASTM C-579 Compressive Strength and ASTM C-580 Flexural Strength are tests for measuring degree of cure, load bearing capability and maximum stress at the moment of cracking or breaking for chemically resistant mortars, grouts and monolithic surfacers.

TABLE 4

FLOORING COMPOSITION

| | Weight (grams) | | | | | |
|---|---|---|---|---|---|---|
| Example | 5 | 6 | 6A | 7 | 8 | 9 |
| Epalloy 8250 | 81.0 | — | — | — | — | — |
| Epon 828 | — | 81.0 | 81.0 | — | 100 | 100 |
| Epon DPL 862 | — | — | — | 81.0 | — | — |
| DC3074 | 15.0 | 15.0 | 15.0 | 15.0 | — | — |
| A-163 | 4.0 | 4.0 | 4.0 | 4.0 | — | — |
| Z6020 | 27.0 | 23.0 | 23.0 | — | — | — |
| Euredur 3265 | — | — | — | — | — | — |
| Ancamine 1942 | — | — | — | 24.0 | 25.8 | — |
| Araldite R972 | — | — | — | — | — | 21.3 |
| BYK 080 | 2.0 | 2.0 | 2.0 | 2.0 | 2.0 | 2.0 |
| F-75 Sand | 336.0 | 336.0 | 336.0 | 336.0 | 336.0 | 336.0 |
| Crystal Silica #70 | 84.0 | 84.0 | 84.0 | 84.0 | 84.0 | 84.0 |
| Silcosil 325 | 30.0 | 30.0 | 30.0 | 30.0 | 30.0 | 30.0 |
| Mechanical Test Results | | | | | | |
| Direct Impact 200 in lbs | Pass | — | — | Pass | Fail | Fail |
| Compressive Strength (psi) | 18,540 | — | — | — | 11,200 | 7,000 |
| Tensile Strength (psi) | 3,400 | — | — | — | 2,900 | 2,300 |
| Flexural Strength (psi) | 5,500 | — | — | — | 5,300 | 3,400 |
| Chemical Resistance - 24 hour Spot Tests | | | | | | |
| NaOH (50%) | 10 | 10 | 10 | 10 | 10 | 10 |
| HCl (Conc.) | 10 | 10 | 6 | 10 | 6 | 8 |
| H$_2$SO$_4$ (Conc.) | 10 | 10 | 6 | 10 | 8 | 8 |
| phenol | 10 | 8 | 4 | 8 | 4 | 8 |
| H$_3$PO$_4$ (Conc.) | 10 | 10 | 4 | 10 | 8 | 10 |
| acetone | 10 | 10 | 10 | 10 | 8 | 10 |
| NH$_4$OH (Conc.) | 10 | 10 | 10 | 10 | 10 | 10 |
| ethanol | 10 | 10 | 10 | 10 | 10 | 10 |
| acetic Acid | 10 | 8 | 4 | 10 | 6 | 10 |
| cumene | 10 | 10 | 10 | 10 | 10 | 10 |

Example 6A is the same as Example 6 except that the epoxy resin was dried over 4A molecular sieves for 24 hours and the pigment/aggregate blend was heated for 48 hours at 110° C. and allowed to cool overnight in a desiccator at 20° C. and 0% humidity before use. The dried epoxy resin, polysiloxane, organooxysilane, defoamer, aminosilane and dried pigment/aggregate blend were mixed for two minutes using a Jiffy mixer and troweled onto a steel panel. The coated panel was then placed in a desiccator at 20° C. and 0% relative humidity and allowed to cure. After 36 hours, Example 6A was tacky compared to Example 6 which was dry hard. After 7 days at 20° C. and 0% RH, the chemical resistance of Example 6A was not as good as the chemical resistance of Example 6. This illustrates the importance of water in the epoxy polysiloxanes of the present invention.

The compressive strength specimens of Examples 5 and 6 and comparative Examples 8 and 9 were immersed for 7 days in 50% sodium hydroxide, 98% sulfuric acid and methyl ethyl ketone. The specimens were removed from the test fluid, rinsed with water and allowed to dry for 48 hours before measuring compressive strength. Examples 5 and 6 retained greater than 92% of their initial compressive strength in all three test fluids. Comparative Example 8 retained greater than 90% of its initial compressive strength in 50% sodium hydroxide, however, the specimens were completely degraded in 98% sulfuric acid or MEK. Comparative Example 9 had percent retention of initial compressive strength of 92% and 80% in 50% sodium hydroxide and MEK, respectively, however the specimens in 98% sulfuric acid were completely degraded.

Examples 5 through 9 clearly show that surfacer and flooring compositions of the present invention have improved chemical resistance, higher compressive strength and higher impact resistance compared to conventional epoxy resin based materials.

Although the present invention has been described with considerable detail with reference to certain preferred variations thereof, other variations are possible. Therefore, the spirit and scope of the appended claims should not be limited to the preferred variations described herein.

What is claimed is:

1. An epoxy-polysiloxane polymer coating composition prepared by combining:

water;

a polysiloxane having the formula $$R_2-O-\left[\begin{array}{c}R_1\\|\\Si-O\\|\\R_1\end{array}\right]_n-R_2$$

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is in the range of from about 400 to 2,000;

an organooxysilane having the formula $$\begin{array}{c}OR_4\\|\\R_3-Si-OR_4\\|\\OR_4\end{array}$$

where $R_3$ is selected from the group consisting of aryl, alkyl, and cycloalkyl groups containing up to six carbon atoms and where $R_4$ is independently selected from the group consisting of alkyl, hydroxyalkyl, alkoxyalkyl and hydroxyalkoxyalkyl groups containing up to six carbon atoms;

a difunctional aminosilane hardener component that condenses through its silane groups with the polysiloxane;

a non-aromatic epoxide resin having more than one 1,2-epoxy groups per molecule with an epoxide equivalent weight in the range of from 100 to about 2,000 that undergoes chain extension by reaction with the amine groups in the polysiloxane to form a fully cured non-interpenetrating polymer network epoxy-polysiloxane polymer; and a pigment or aggregate component.

2. The coating composition as recited in claim 1 wherein the non-aromatic epoxide resin is selected from the group of cycloaliphatic epoxide resins consisting of hydrogenated cyclohexane dimethanol and diglycidyl ethers of hydrogenated Bisphenol A epoxy resins.

3. The coating composition as recited in claim 1 wherein the difunctional aminosilane has the general formula $$Y-Si-(O-X)_3$$

where Y is $H(HNR)_a$ and where a is one, R is a difunctional organic radical independently selected from the group consisting of aryl, alkyl, dialkylaryl, alkoxyalkyl, and cycloalkyl radicals, and where X is limited to alkyl, hydroxyalkyl, alkoxyalkyl or hydroxyalkoxyalkyl groups containing less than about six carbon atoms.

4. The coating composition as recited in claim 1 wherein the composition additionally comprises at least one metal catalyst to facilitate cure at ambient temperature, wherein the catalyst is selected from the group consisting of zinc, manganese, cobalt, iron, lead, and tin each in the form of octonates, neodecanates, or naphthanates.

5. The coating composition as recited in claim 1 comprising at least one additional ingredient selected from the group consisting of rheological modifiers, plasticizers, antifoam agents, thixotropic agents, pigment wetting agents, bituminous and asphaltic extenders, antisettling agents, diluents, UV light stabilizers, air release agents, dispersing aids, and mixtures thereof.

6. The coating composition as recited in claim 1 wherein the pigment or aggregate material comprises a fine particle size material selected from the group consisting of organic and inorganic color pigments, at least 90 percent by weight of the pigment being greater than 325 mesh U. S. sieve size.

7. The coating composition as recited in claim 6, comprising up to 50 percent by weight aggregate material based on the total weight of the composition.

8. The coating composition as recited in claim 6, comprising a weight ratio of polysiloxane to organooxysilane of approximately six to one, a weight ratio of polysiloxane to hardener of approximately two to one, and a weight ratio of hardener to organooxysilane of approximately three to one.

9. An epoxy-polysiloxane polymer coating composition prepared by combining:

a polysiloxane selected from the group consisting of methoxy, ethoxy, and silanol functional polysiloxanes having a molecular weight in the range of from about 400 to 2,000;

an organooxysilane having the formula $$\begin{array}{c}OR_4\\|\\R_3-Si-OR_4\\|\\OR_4\end{array}$$

where $R_3$ is selected from the group consisting of aryl, alkyl, and cycloalkyl groups containing up to six carbon atoms and where $R_4$ is independently selected from the group consisting of alkyl, hydroxyalkyl, alkoxyalkyl and hydroxyalkoxyalkyl groups containing up to six carbon atoms;

a difunctional aminosilane hardener component that condenses through its silane groups with the polysiloxane having the general formula $$Y-Si-(O-X)_3$$

where Y is $H(HNR)_a$ and where a is one, R is a difunctional organic radical independently selected from the group consisting of aryl, alkyl, dialkylaryl, alkoxyalkyl, and cycloalkyl radicals, and where X is limited to alkyl, hydroxyalkyl, alkoxyalkyl or hydroxyalkoxyalkyl groups containing less than about six carbon atoms;

a non-aromatic epoxide resin that undergoes chain extension by reaction with the amine groups in the polysiloxane to form a fully cured epoxy-polysiloxane polymer;

an organotin catalyst; and a sufficient amount of water to facilitate hydrolysis and polycondensation to form a fully cured coating at ambient temperature.

10. The coating composition as recited in claim 9 wherein the non-aromatic epoxide resin contains more than one 1,2-epoxy groups per molecule and has an epoxide equivalent weight in the range of from 100 to 2,000.

11. The coating composition as recited in claim 9 further comprising additives up to approximately ten percent by weight of the total composition, wherein the additives are selected from the group consisting of flow modifiers, rheological modifiers, plasticizers, antifoam agents, thixotropic agents, pigment wetting agents, bituminous and asphaltic extenders, antisettling agents, diluents, UV light stabilizers, air release agents, and dispersing aids.

12. The coating composition as recited in claim 9 comprising a fine particle size pigment or aggregate material selected from the group consisting of organic and inorganic color pigments, wherein the aggregate material comprises at least 90 percent by weight aggregate having a U. S. mesh size greater than 325 based on the total weight of the aggregate material.

13. The coating composition as recited in claim 9 comprising in the range of from 15 to 45 percent by weight non-aromatic epoxide resin, in the range of from 15 to 45 percent by weight polysiloxane, in the range of from one to ten percent by weight organooxysilane, in the range of from 10 to 20 percent by weight hardener, and up to 50 percent by weight aggregate based on the total weight of the composition.

14. The coating composition as recited in claim 13 comprising approximately 25 percent by weight non-aromatic epoxide resin, 30 percent by weight polysiloxane, five percent by weight organooxysilane, 15 percent by weight amine ingredient, 20 percent by weight aggregate, and the remaining percent by weight solvent and additives based on the total weight of the composition.

15. The coating composition as recited in claim 10 wherein the non-aromatic epoxide resin is selected from the group of cycloaliphatic epoxy resins consisting of hydrogenated cyclohexane dimethanol and diglycidyl ethers of hydrogenated Bisphenol A epoxide resins.

16. The coating composition as recited in claim 9 wherein the polysiloxane has the formula

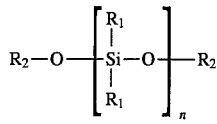

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is in the range from about 400 to 2,000, and wherein the polysiloxane is present in the range of from 15 to 45 percent by weight of the total composition.

17. A method for making a fully-cured thermosetting epoxy-polysiloxane polymer coating composition comprising the steps of:

forming a resin component by combining:

a non-aromatic epoxide resin;

a polysiloxane selected from the group consisting of methoxy, ethoxy, and silanol functional polysiloxanes having a molecular weight in the range of from 400 to 2,000;

an organooxysilane having the formula

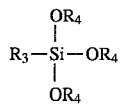

where $R_3$ is selected from the group consisting of aryl, alkyl, and cycloalkyl groups containing up to six carbon atoms and where $R_4$ is independently selected from the group consisting of alkyl, hydroxyalkyl, alkoxyalkyl and hydroxyalkoxyalkyl groups containing up to six carbon atoms; and water; and curing the resin component at a temperature below about 100° F. by adding to the resin component:

an aminosilane with two active hydrogens that condenses through its silane groups with the polysiloxane, whereby the non-aromatic epoxide resin undergoes chain extension by reaction with the amine groups in the polysiloxane to form a fully cured epoxy-polysiloxane polymer; and an organotin catalyst.

18. A method as recited in claim 17 wherein during the step of forming the resin component one or more ingredient is added that is selected from the group consisting of pigments, aggregates, flow modifiers, rheological modifiers, plasticizers, antifoam agents, thixotropic agents, pigment wetting agents, bituminous and asphaltic extenders, antisettling agents, diluents, UV light stabilizers, air release agents and dispersing aids.

19. A non-interpenetrating polymer network epoxy-polysiloxane polymer coating composition prepared by combining:

water;

a polysiloxane having the formula

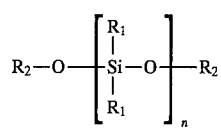

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is in the range of from about 400 to 2,000;

a difunctional aminosilane hardener component that condenses through its silane groups with the polysiloxane and has the general formula

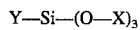

where Y is $H(HNR)_a$ and where a is one, R is a difunctional organic radical independently selected from the group consisting of aryl, alkyl, dialkylaryl, alkoxyalkyl, and cycloalkyl radicals, and where X is limited to alkyl, hydroxalkyl, alkoxyalkyl or hydroxyalkoxyalkyl groups containing less than about six carbon atoms;

an organooxysilane having the formula

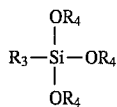

where $R_3$ is selected from the group consisting of aryl, alkyl, and cycloalkyl groups containing up to six carbon atoms and where $R_4$ is independently selected from the group consisting of alkyl, hydroxyalkyl, alkoxyalkyl and hydroxyalkoxyalkyl groups containing up to six carbon atoms; and a non-aromatic epoxide resin having more than one 1,2-epoxy groups per molecule with an epoxide equivalent weight in the range of from 100 to about 2,000 that undergoes chain extension by reaction with the amine groups in the polysiloxane to form a fully cured non-interpenetrating polymer network epoxy-polysiloxane polymer.

20. A method for making a fully-cured thermosetting epoxy-polysiloxane polymer coating composition comprising the steps of:

forming a resin component by combining:

a polysiloxane having the formula

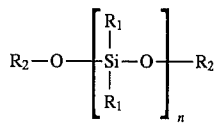

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is in the range of from about 400 to 2,000;

a non-aromatic epoxide resin having more than one 1,2-epoxy groups per molecule with an epoxide equivalent weight in the range of from 100 to about 2,000;

an organooxysilane having the formula

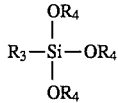

where $R_3$ is selected from the group consisting of aryl, alkyl, and cycloalkyl groups containing up to six carbon atoms and where $R_4$ is independently selected from the group consisting of alkyl, hydroxyalkyl, alkoxyalkyl and hydroxyalkoxyalkyl groups containing up to six carbon atoms; and water;

curing the resin component at ambient temperature by adding to the resin component:

an organotin catalyst; and an aminosilane with two active hydrogens that condenses through its silane groups with the polysiloxane, whereby the non-aromatic epoxide resin undergoes chain extension by reaction with the amine groups in the polysiloxane to form a fully cured epoxy-polysiloxane polymer.

* * * * *

UNITED STATES PATENT AND TRADEMARK OFFICE
CERTIFICATE OF CORRECTION

PATENT NO. : 5,618,860
DATED : April 8, 1997
INVENTOR(S) : Norman R. Mowrer; Raymond E. Foscante; J. Luis Rojas It is certified that error appears in the above-indentified patent and that said Letters Patent is hereby corrected as shown below:

On the title page, Abstract, line 7, change "an difunctional" to
-- a difunctional --.
Column 1, line 19, change "well know" to -- well known --.
Column 2, line 41, change "hydrolyric" to -- hydrolytic --.
Column 5, line 60, change "hydrolyric" to -- hydrolytic --.
Column 6, line 6, after "ingredients" insert -- and which --.
Column 7, line 4, change "Rhone-Poulene" to -- Rhone-Poulenc --.
Column 7, line 67, change "$R_2$comprise" to -- $R_2$ comprise --.
Column 9, line 13, change "kerimines" to -- ketimines --.
Column 9, line 18, replace "where one" with -- where a is one --.
Column 9, line 23, change "hydroxalkyl" to -- hydroxyalkyl --.
Column 9, line 47, change "H$ls" to -- Hüls --.
Column 9, line 59, change "hydroxalkyl" to -- hydroxyalkyl --.
Column 10, line 4, change "non-cross linked" to -- non-cross-linked --.
Column 12, line 20, change "inches" to -- inch --.
Column 12, line 49, change "kerimines" to -- ketimines --.
Column 13, line 14, change "diethanoi" to -- diethanol --.
Column 13, line 65, change "hydrolyric" to -- hydrolytic --.
Column 14, line 11, replace "rein" with -- resin --.
Column 14, line 13, change "insutu" to -- in situ --.
Column 14, line 36, change "hydrolyric" to -- hydrolytic --.
Column 14, line 67, after "water" insert a period.
Column 15, line 66, change "Hydrolyric" to --Hydrolytic--.
Column 16, line 4, change "infinate" to -- infinite --.
Column 17, line 35, after "with" delete "a".
Column 19, line 65, after "tested" delete "using".

UNITED STATES PATENT AND TRADEMARK OFFICE
CERTIFICATE OF CORRECTION

PATENT NO. : 5,618,860
DATED : April 8, 1997
INVENTOR(S) : Norman R. Mowrer; Raymond E. Foscante; J. Luis Rojas It is certified that error appears in the above-indentified patent and that said Letters Patent is hereby corrected as shown below:

Column 22, lines 6,7, change "hydroxalkyl" to -- hydroxyalkyl --.
Column 22, line 63, change "hydroxalkyl" to -- hydroxyalkyl --.
Column 23, line 38, replace "amine ingredient" with -- hardener --.
Column 23, line 60, after "range" insert -- of --.
Column 24, lines 19,20, replace "a temperature below about 100°F." with
    -- ambient temperature --.
Column 24, line 65, change "hydroxalkyl" to -- hydroxyalkyl --.

Signed and Sealed this

Twelfth Day of May, 1998

Attest:

BRUCE LEHMAN

*Attesting Officer*     *Commissioner of Patents and Trademarks*